United States Patent [19]

Nyström Per H. G.

[11] 4,416,187
[45] Nov. 22, 1983

[54] ON-OFF VALVE FLUID GOVERNED SERVOSYSTEM

[76] Inventor: Nyström Per H. G., Grahallavägen 10, SE-490 30 Borensberg, Sweden

[21] Appl. No.: 233,130

[22] Filed: Feb. 10, 1981

[51] Int. Cl.³ ................... F15B 13/044; F15B 13/16
[52] U.S. Cl. .......................................... 91/361; 91/454
[58] Field of Search ............... 91/361, 459, 457, 454, 91/363 R, 448

[56] References Cited

U.S. PATENT DOCUMENTS

| | | | |
|---|---|---|---|
| 3,295,421 | 1/1967 | McCormick | 91/457 X |
| 3,530,873 | 9/1970 | Arp et al. | 137/99 |
| 4,138,632 | 2/1979 | Pauwels et al. | 318/341 X |
| 4,265,163 | 5/1981 | Arao et al. | 91/457 X |

FOREIGN PATENT DOCUMENTS 2345845  9/1973  Fed. Rep. of Germany ........ 91/457

Primary Examiner—Robert E. Garrett
Assistant Examiner—Abram M. Bradley, IV
Attorney, Agent, or Firm—Laurence R. Brown

[57] ABSTRACT

In a pulse modulated servosystem having solenoid activated on-off valves governing the amount of fluid in two variable volume chambers of a double-acting piston-cylinder unit any limitation of the accuracy due to inertia of the valves is eliminated by influencing both chambers in opposite directions.

1 Claim, 4 Drawing Figures

ON-OFF VALVE FLUID GOVERNED SERVOSYSTEM

PRIOR ART REFERENCES

U.S. Pat. No. 4,039,917
U.S. Pat. No. 4,138,632
German Offenlegungsschrift No. DE-2345845
Swedish pat. appl. No. SE-7613642-3 (Publ. No. 402961)
Swedish pat. appl. No. SE-7714476-4 (Publ. No. 409602)
Swedish pat. spec. No. 359621

BACKGROUND OF THE INVENTION

This invention relates to a servosystem of the type comprising in a fluid-actuated, double-acting piston-cylinder unit and two on-off valves for governing supply of fluid to said unit, and in which each valve is pulse-governed and arranged between a high pressure source and a low pressure reservoir for said fluid, two conduits for supplying fluid to the said piston-cylinder unit being branched off from a fluid connection between the said high pressur source and the said valves.

In the known servosystems of this type the time-lag of the on-off valves will cause problems which may be solved by using series connected valves in conduits for the fluid, said valves being governed to partly overlap each other e.g. by phase modulation.

OBJECT AND SUMMARY OF THE INVENTION

The object of the present invention is to obtain a servosystem which is accurate and reliable in operation and claims a minimum of valves and electronic equipment.

The servosystem according to the present invention is characterised in that each of the conduits for supplying fluid to the piston-cylinder unit has been branched off after a restriction and that each of said valves are governed by a separate amplifier output signal of a common controller.

It is hereby obtained that the piston-cylinder unit may be continously influenced by pulse trains in both directions. It is not only obtained that the time-lag of the valves is eliminated, but also that the servo-system will operate without friction and react with accuracy during any performance.

DETAILED DESCRIPTION

Figure 1:
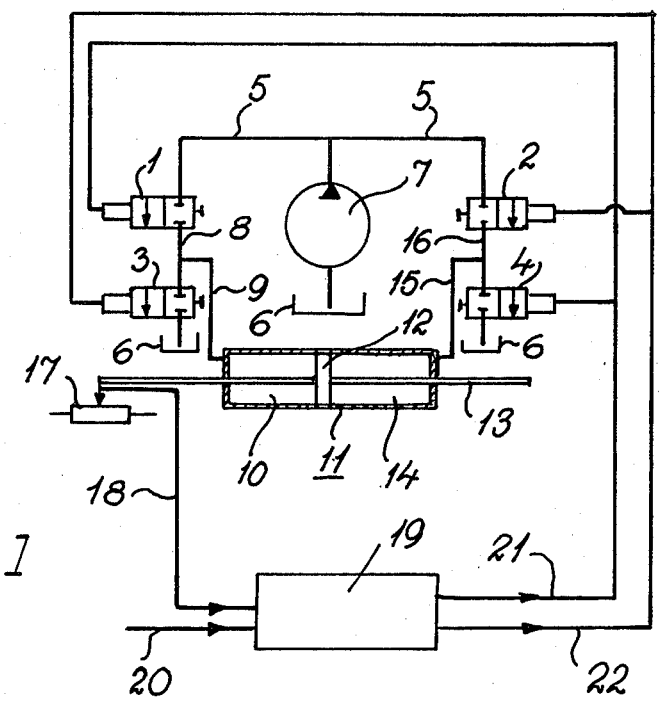
FIG. 1 shows a servo-system according to the invention.

Referring first to the embodiment of FIG. 1 the reference numerals 1-4 designate four solenoid governed valves, all of them being shown in their "off" position. The valves 1 and 3 form a pair of valves being series connected between a high pressure source—indicated as conduits 5—and a low pressure reservoir 6 for a fluid. Said fluid is oil in the embodiment shown, but could alternatively be e.g. compressed air. The pressure is provided by a pump 7. The valves 1 and 3 are interconnected by a conduit 8 from which a conduit 9 has been branched off and is connected to a first variable volume chamber 10 in a double-acting piston-cylinder unit 11. Said unit comprises a piston 12 rigidly connected to a piston rod 13. A second variable volume chamber 14 is connected to a conduit 16 via a conduit 15, the conduit 16 connecting the valves 2 and 4.

The axial position of the piston rod 13 will influence a position indicator 17 giving a signal via a wire 18 to a controller 19. In said controller 19 the signal obtained from the indicator 17 is compared with a governing signal supplied through a wire 20 and corresponding to a desired axial position of the rod 13. The controller 19 emits two trains of pulses—one through a wire 21 to the solenoids of the valves 1 and 4 and another through a wire 22 to the solenoids of the valves 2 and 3.

Figure 2:
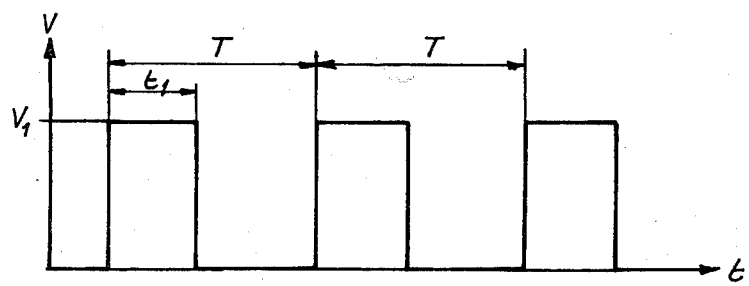
FIG. 2 shows a valve governing pulse train.
Figure 3:
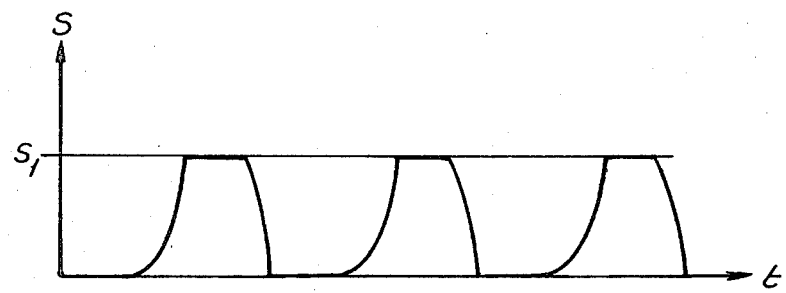
FIG. 3 shows a corresponding pulse train of valve operations and
FIG. 4 shows an alternative embodiment of a servo-system according to the invention.

Each pulse train is of the type shown in FIG. 2. Here the voltage V is shown as a function of the time t. During equal periods T the voltage is $v_1$ during part $t_1$ of each period, while it is zero during the remaining part of the period—i.e. T—$t_1$. A solenoid activated valve being influenced by the pulse train of FIG. 2 will perform opening and closing movements as shown in FIG. 3. Here the valve travel is designated by S and a fully opened valve is obtained after a travel distance $s_1$. It appears that due to reactance and inertia of a solenoid governed valve a complete opening will be dependant on obtaining a certain proportion between $t_1$ and T.

The servosystem of FIG. 1 is influenced in both directions—in one direction by the pulses through the wire 21 and in the other by the pulses through the wire 22. Thus it will be the difference between the pulse width $t_1$ of the two pulse trains and not the actual width which will determine the function of the servosystem. As the piston 11 is always influenced in both directions the friction in the piston-cylinder unit is eliminated. The most simple system will use the same frequency (1/T) in both pulse trains—the one through the wire 21 and the one through the wire 22. The pulses may be emitted alternatively through the two wires.

Figure 4:
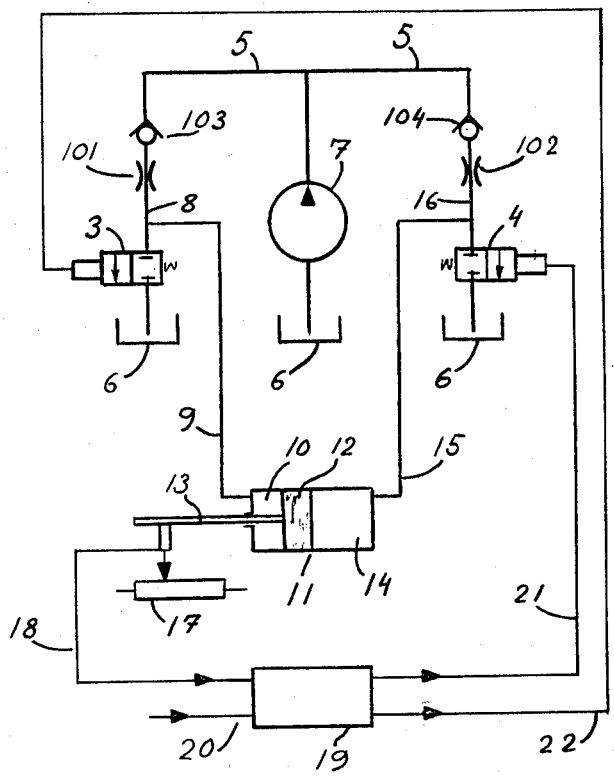

The embodiment according to FIG. 4 differs from the one of FIG. 1 thereby that the valves 1 and 2 have been replaced by restrictions 101 and 102 connected in series with non-return valves 103 and 104.

This embodiment is cheaper in manufacture, but is somewhat slower in operation. In many applications the slower operation is of no importance. The non-return valves are not necessary for the function of the servosystem, but makes it possible to retain the system locked in desired position by closing the valves 3 and 4.

I claim:

1. A servosystem comprising in combination, a fluid-actuated double-acting piston-cylinder unit, two on-off electrically controlled valves for governing supply of fluid to said unit arranged between a high pressure source and a low pressure reservoir for said fluid, two conduits for supplying fluid form said source to the opposing sides of said piston each having a branch connection being branched off from a fluid connection between the said high pressure source and one of said valves, common controller means coupled for operating the valves with two separate alternating trains of electrical pulses of variable width synchronously emitted therefrom, fluid control means connected between each of the said conduits and the source for supplying fluid to said piston from the source, means governing the opening and closing of each of said valves by said two separate output pulse signal trains emitted from said common controller in a manner respectively tending to move said piston in opposite directions to a servo position established in response to difference in pulse width in the two said pulse trains, and means for influencing the controller output pulse trains to establish said servo position in response to a comparison of the position of the piston with a governing signal, wherein said fluid control means consist of on-off valves governed by said pulse trains and are coupled upstream between said conduits and the high pressure source, and wherein one valve upstream to the branch connection of one conduit to the said piston and the valve downstream to the branch connection of the other conduit to the said piston are connected to a first of said pulse trains for synchronous governing, and that the two remaining valves are connected to the second of said pulse trains.

* * * * *